United States Patent

[11] 3,596,877

| [72] | Inventor | Budd Eastman |
| | | Holland, Mich. |
| [21] | Appl. No. | 888,107 |
| [22] | Filed | Dec. 17, 1969 |
| | | Division of Ser. No. 691,603, Dec. 18, 1967, Pat. No. 3,518,890 |
| [45] | Patented | Aug. 3, 1971 |
| [73] | Assignee | Holland Hitch Co. |
| | | Holland, Mich. |

[54] SCREW HOIST, ESPECIALLY FOR TRAILER LANDING GEAR
8 Claims, 6 Drawing Figs.

[52] U.S. Cl. ..................................................... 254/86 R
[51] Int. Cl. ...................................................... B60s 9/02
[50] Field of Search ........................................ 94/424.8;
254/86, 103

[56] References Cited
UNITED STATES PATENTS

| 2,747,422 | 5/1956 | Walther | 254/86 X |
| 3,064,944 | 11/1962 | Dalton | 254/86 |
| 3,222,948 | 12/1965 | De Mart | 74/424.8 |
| 3,454,136 | 7/1969 | Stark | 74/424.8 X |

*Primary Examiner*—Othell M. Simpson
*Attorney*—Price, Heneveld, Huizenga & Cooper ABSTRACT: A special screw and nut assembly for operation under compression, especially as a hoist in a haulage vehicle landing gear, having substantially increased load supporting capacity and substantially greater ease of operation for elevating heavy loads, as a result of a combination of structural relationships. The threaded nut inner surface acts as a bearing bushing for the screw shaft by reason of minimal clearance between the screw core diameter and the nut root diameter, or less preferably between the nut thread full diameter and the screw outside diameter. The helix angle of both members is within a specific controlled range. The thread angle of both members is within a specific controlled range. The thread to shaft diameter is relatively large. The details of these and related features are set forth hereinafter.

Patented Aug. 3, 1971 3,596,877
2 Sheets-Sheet 1
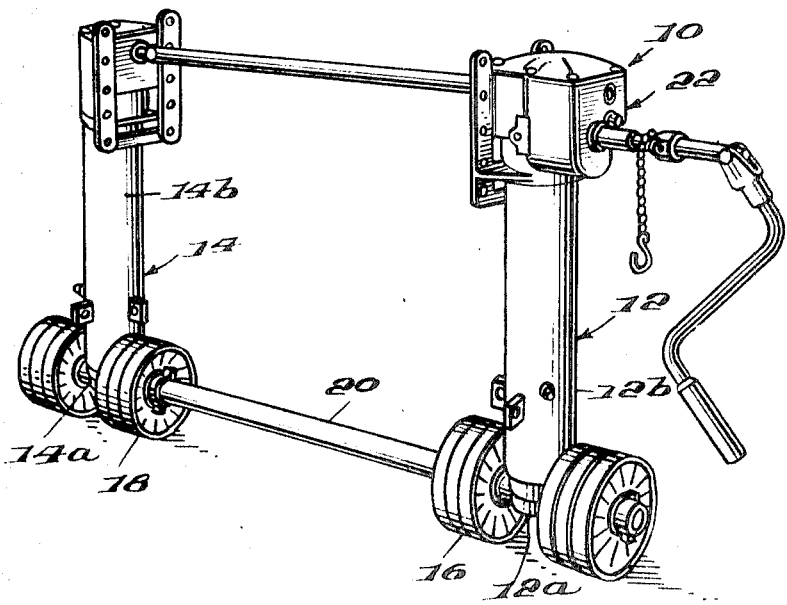
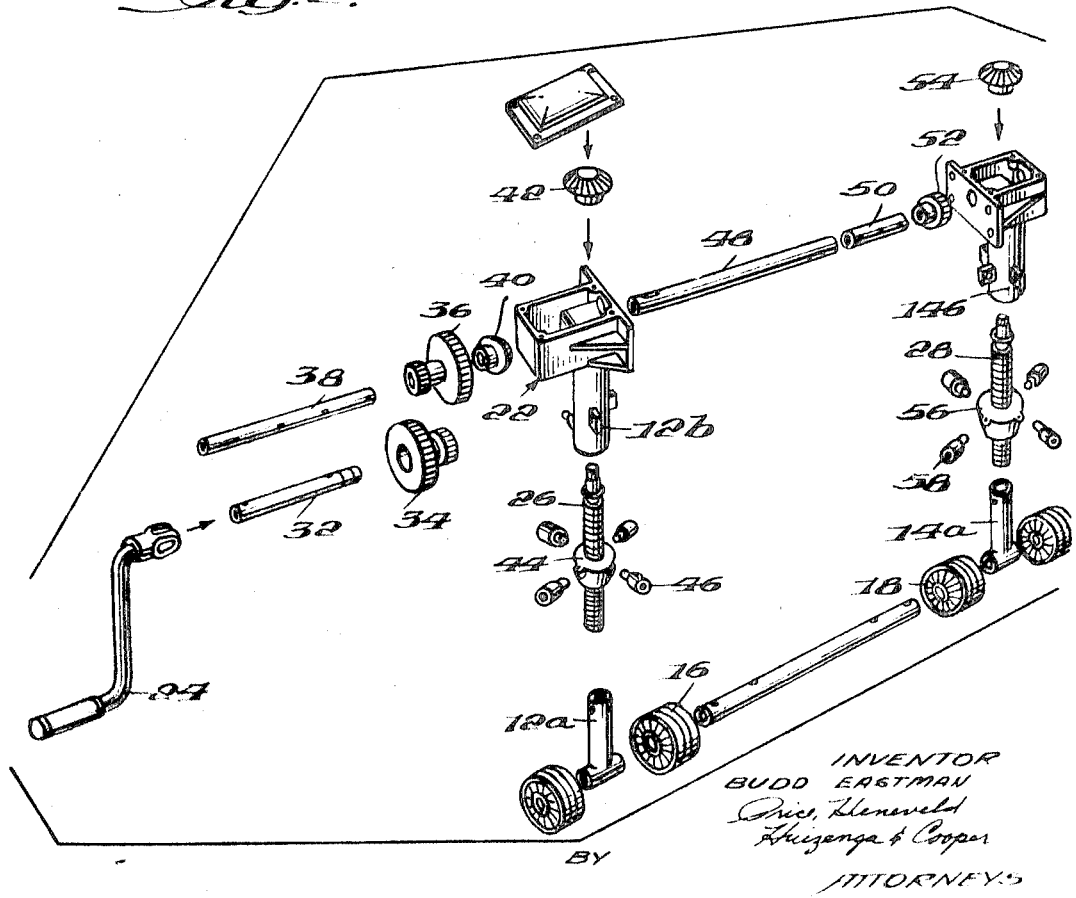
INVENTOR
BUDD EASTMAN
BY
ATTORNEYS

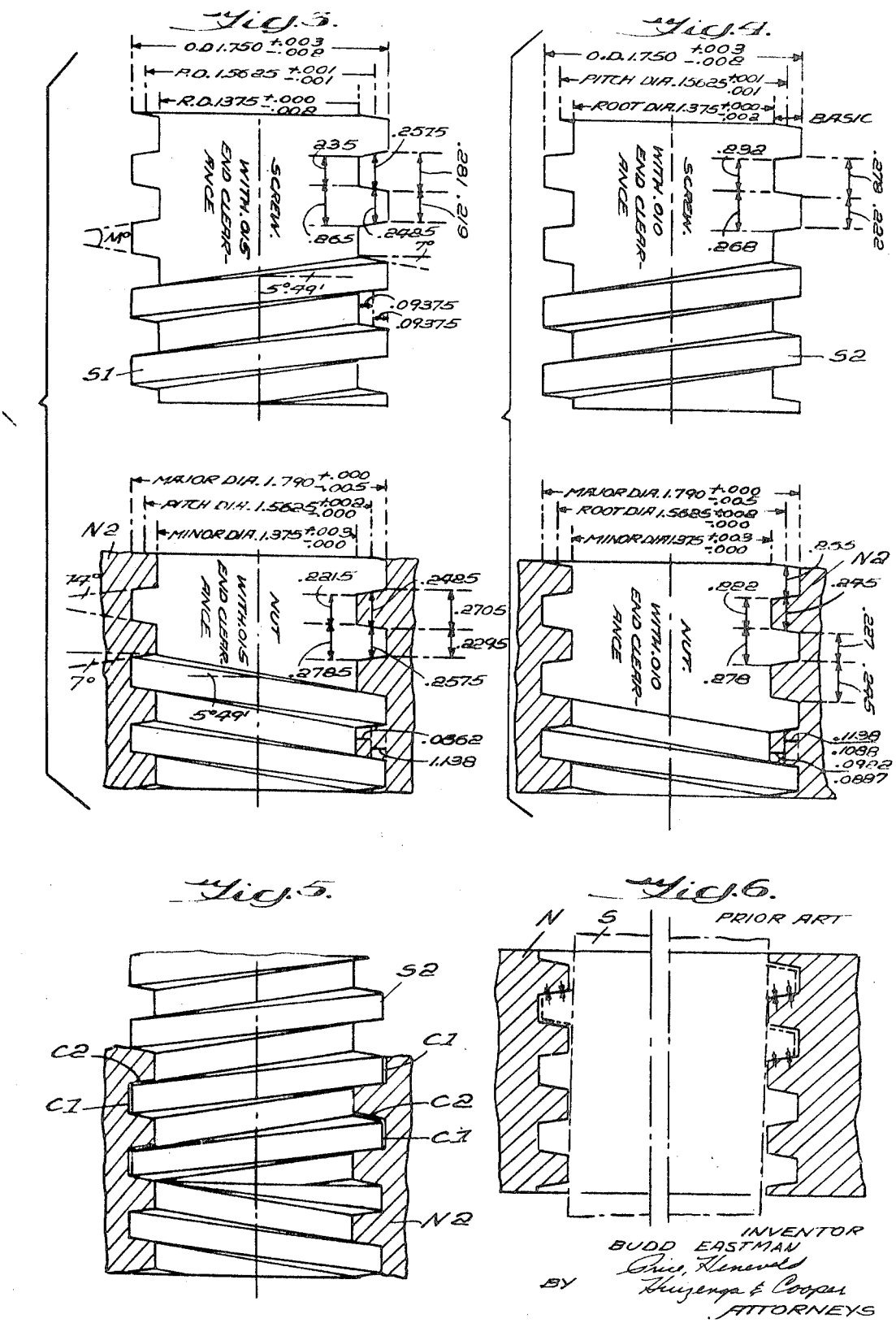

SCREW HOIST, ESPECIALLY FOR TRAILER LANDING GEAR

This is a divisional application of parent application Ser. No. 691,603, now U.S. Pat. No. 3,518,890 filed Dec. 18, 1967, and entitled SCREW HOIST, ESPECIALLY FOR TRAILER LANDING GEAR.

BACKGROUND OF THE INVENTION

This invention relates to landing gear apparatus for haulage vehicle trailers, and more particularly relates to the screw and nut assembly for load elevating systems.

The invention herein was conceived and developed in response to particular problems and shortcomings of present landing gear systems for the trailers of haulage vehicles, i.e. semitrailers, and therefore will largely be explained in this context. However, the invention could conceivably be employed for similar hoisting systems in other environments such as hoisting of house trailers, or other compression loading environments, wherein misalignment may be present.

Conventional landing gear systems frequently are constructed to be manually operated to elevate a trailer off a fifth wheel or other connection to a truck cab. Since loaded trailers must sometimes to so elevated, the screw and nut elevating mechanism in each leg of the landing gear is designed with sufficient mechanical advantage to enable a person to crank up the load. Since known screw-type, crank-actuated landing gear systems involve very substantial resistance during load elevation. The screw, nut and drive assembly is normally designed as a compromise between excessive cranking load and excessive number of crank revolutions per inch of elevation. Even so, several dozen crank revolutions are required under tiring crank loads of about 80–100 foot pounds. As a result, truck drivers detest this task and try to avoid it where possible. For example, there is a tendency for drivers to try to ram the fifth wheel on the cab back under the trailer to engage the king pin. This too often results in considerable damage to the equipment.

One reason why the cranking force is so great is because of the tremendous frictional forces created between the elevating screw and nut combination. The legs on the landing gear tend to cock and/or bow under load, causing binding between the screw and nut. This not only immediately increases the frictional resistance, but also causes considerable wear on the Acme threads typically used, so that this resistance gets constantly worse in a relatively short usage time.

Such thread wear is also detrimental to safety. Specifically, careful analysis has shown that the entire load frequently is borne by only one thread of the screw assembly, due to angularity of axis of thread and nut. This puts tremendous stress on such a thread. Moreover, the above-noted thread wear significantly lowers the load bearing capacity of each thread greatly increasing the likelihood of failure of that thread. And, if a worn thread shears off, the remaining threads are also instantly stripped out under the impact of the falling load, in extremely hazardous and damaging manner.

SUMMARY OF THE INVENTION

It is an object of this invention to provide a landing gear assembly screw and nut combination having substantially improved operational ease, safety, and useful life resulting from certain controlled dimensional relationships and criteria. Specifically, the screw threads and nut threads are dimensionally related to achieve a simulated bearing/bushing relationship that facilitates improved operation even though the landing gear legs tend to bow and apply a bowing force on the screw. Crank loads of only about 50 foot pounds are achieved on the same mechanical advantage arrangements exhibiting 80–100 foot pounds previously. Moreover, the novel structure provides self-wiping lubrication with a special built-in grease fitting between the threads made possible by the novel construction.

Another object of this invention is to provide a power screw and nut combination exhibiting substantially improved operational characteristics under load due to controlled diametral relationships of the threads. The screw and nut also have controlled thread angle and helix angle relationships. Tests of the novel structure against conventional units prove the capacity of the threads in the novel combination to remain intact when the threads of conventional units are completely stripped out. Further, after a period of use, the conventional unit threads are worn and stripped out under a fraction of the load safely applied to the novel unit threads.

Other objects and advantages as well as details of construction of the novel assembly will become apparent from the following detailed description of the novel structure.

BRIEF DESCRIPTION OF THE DRAWINGS

FIG. 1 is a perspective view of one type of landing gear assembly containing the novel screw assembly in each leg;

FIG. 2 is a perspective exploded view of the main operative components of the landing gear assembly in Fig. 1;

FIG. 3 is an enlarged, sectional, exploded, elevational, fragmentary view of the novel screw and nut combination;

FIG. 4 is an enlarged, exploded, elevational, fragmentary, sectional view of the novel screw and nut combination with a different axial clearance relationship than that in FIG. 3;

FIG. 5 is an enlarged, fragmentary, elevational, sectional view of the novel screw and nut combination in FIG. 4, shown interfitted; and FIG. 6 is a fragmentary, enlarged, sectional, elevational view of a typical prior art combination of interfitted screw and nut under load.

DESCRIPTION OF THE PREFERRED EMBODIMENTS

The landing gear assembly 10 includes a pair of vertical telescopic leg housings 12 and 14, each having a lower inside leg 12a and 14a respectively, telescopically received in upper outside legs 12b and 14b respectively. Attached to the lower legs is a plurality of ground engaging wheels 16 and 18 on ends of a cross axle 20 (or alternately skid feet of conventional type). Attached to the upper end of one of the housings (here housing 12) is a gear box 22 which contains gear mechanism (Fig. 2) to drivenly connect protruding crank 24 with the screw shafts 26 and 28 in housings 12 and 14. Specifically crank 24 is drivenly connected to screw 26 by being connected to horizontal shaft 32, on which is mounted spur gear 34 that engages spur gear 36 on horizontal shaft 38, to which bevel gear 40 is also mounted. Bevel gear 40 engages bevel gear 42 mounted on the upper end of vertical screw 26. Screw 26 is threadably engaged in and received by nut 44 that is secured by bolts 46 to lower leg 12a. Spur gears 34 and 36 are preferably constructed to provide an optional two-speed arrangement in conventional manner. Crank 24 is drivenly connected to screw 28 through shaft 32, gear 34, gear 36, shaft 38, and gear 40 which is also connected to transverse connecting shaft 48. Shaft 48 is connected to shaft 50 on which is mounted bevel gear 52 that engages bevel gear 54. Gear 54 is mounted on the upper end of vertical screw 28. Screw 28 is threadably received by nut 56 that is secured to lower leg 14a by bolts 58.

Rotation of crank 24 therefore rotates screws 26 and 28, to thereby lower or raise nuts 44 and 56 on screws 26 and 28, to lower or raise the attached ground engaging subassembly. Upon this ground engaging assembly initially engaging the ground as it is lowered, further cranking elevators the upper subassembly and hence the trailer or other apparatus mounted thereon. This strenuous, normally requiring many many crank revolutions. For example, typically about 31 crank revolutions is required per inch of elevation at the high power, low speed position of a two-speed gear box. At a typical required cranking force of about 80 foot pounds or more to elevate an average load, this cranking effort rapidly becomes extremely tiresome.

When elevating a load with the landing gear assembly, a force tending to bow the landing gear leg housings and contained screws almost always occurs as the screws are put under tremendous compression load and the skid feet or wheels press down on a more or less irregular surface. To keep the telescopic legs from binding under these loaded conditions, manufacturers conventionally provide lateral clearance between the telescopic leg members. Further, to keep the screw from binding in the nut under this bowing tendency, manufacturers conventionally provide substantial axial and diametral clearances between the screw and nut threads. Careful examination of these conventional threads under load shows the interfit to be similar to that illustrated in Fig. 6. The screw S tends to cock in the nut N due to the large clearances provided to prevent binding. The cocked position of the screw in the nut causes most of the threads to be shifted laterally out of total engagement and into only partial or nil load bearing condition (Fig. 6). Extensive experimentation shows that practically all of the load is borne by the upper one or two nut threads and correspondingly engaged screw threads. This cocking causes localized load concentration between the upper screw thread and the upper nut thread, and specifically between the lower surface of this screw thread and the engaged upper surface of the nut thread on one side (right) (Fig. 6) and between the upper surface of this screw thread and the lower surface of the engaging nut thread on the opposite side (left), rather than an even annular distribution of force around the entire lower surface of the screw thread and entire upper surface of the nut thread.

Failure of the one or two threads allows such a downward momentum of the load to be created that all of the remaining threads are usually completely stripped out, even if they are in relatively good condition, to cause equipment failure. And there is a tendency for these upper threads to quickly become worn and weakened due to the tremendous galling forces constantly applied under the localized concentrated forces noted above and illustrated by the arrows in Fig. 6.

The present invention was achieved by a basic departure from the universally accepted theory of landing gear manufacturers of providing substantial screw and nut clearances as the solution to prevent binding under the bowing force applied to loaded landing gear legs and their screws. It was found after extensive experimentation over a long period of time that a special simulated bearing/bushing effect could be obtained between the screw and nut threads that results in smooth, low friction operation, if certain dimensional relationships and thread configuration factors are controlled within certain ranges.

The most important of these relationships is that of substantially no clearance between the core (i.e. minor) diameter of the screw and the root (i.e. minor) diameter of the nut. This relationship is preferred over an alternate relationship of substantially no clearance between the outside (i.e. major) screw diameter and the full (i.e. major) nut diameter. Preferably, this clearance is zero or nil, but due to manufacturing tolerances may be up to about 0.0075 inch, although the effectiveness of the apparatus begins decreasing rapidly above about 0.005 inch clearance. Therefore, manufacturing operations should be controlled as much as possible to keep the clearance within the practical range of about 0.002–0.005 inch. It is significant to note with regard to this factor that a clearance of 0.015–0.020 in a 1.750 inch outside diameter landing gear screw proved totally unsuitable under operational tests. The unit tended to bind up quite rapidly, and was difficult to operate. This substantially nil clearance factor must therefore be carefully maintained. In either above situation wherein either the two minor diameters or the two major diameters of the screw and nut have substantially no clearance, the alternate diameters have significant clearance. This clearance C1 is preferably of relatively substantial size to cause this helical space to form a special lubricant reservoir, e.g. of about 0.040 inch clearance. This is preferably between the major diameter portions of the threads as shown in Figs. 3 and 4.

The axial relationship of the screw and nut threads is purposely one of definite but limited end or axial clearance C2. While this may range from about 0.002 up to about 0.025 inch, normally an axial clearance of only 0.002 involves the risk of thread binding, and an axial clearance of as much as about 0.025 inch increases the possibility of thread failure. Preferably the axial end clearance is between about 0.005 and about 0.015 inch.

It was determined through experiment that the thread helix angle is also important to the invention. Specifically, it is to be within the range of about 4° 40′ to about 7°. Departure from this range markedly decreases the operational effectiveness for this combination. Significant departure of a couple of degrees or more renders the novel thread system impractical.

Another configuration factor of importance is the flank angle of the sidewall of the thread. This flank angle is small, and should be between 0° and about 10°, preferably between about 6° and about 10°, with about 7° being the most preferred. By the term flank angle is intended the angle between the one wall of the thread and a plane bisecting the thread. Expressed in other commonly used terms, this represents a "thread angle" range of 0°–20°, with a preferred range of about 12°–20°, with a preferred range of about 12°–20°, and the most preferred being about 14°. This thread angle, as will be noted, is twice the noted flank angle, since it represents the angle between the two side walls of the thread.

In this novel screw and nut combination, the threads are preferably also substantially larger than conventional threads used in landing gear equipment and like apparatus. Specifically, the thread depth is preferably three-quarter pitch, but generally in the range of five-eighths pitch to seven-eighths pitch. If the depth is reduced to about one-half pitch or less, thread wear becomes excessive, while if it is increased to full pitch or more, the screw is too weak for landing gear type usage.

The helix angle and thread angle are substantially the same for the screw and its cooperating nut.

In Figs. 3 and 4 are illustrated two typical screw and nut combinations S1, N1 and S2, N2 respectively, of this invention for use in a landing gear assembly, with dimensions being noted on the drawings for clarity. These representative screws are both ¾ inches, i.e. 1.750 inches in diameter. In both of these examples, the bearing/bushing effect is obtained between the screw core diameter and the nut root diameter. Both are preferably 1.375 inches to have no clearance therebetween, although slight tolerance variations with a total possible additive maximum tolerance of 0.005 inch are provided for practical manufacturing purposes, (i.e. a possible total of −0.002 inch on the screw and +0.003 inch on the nut).

The clearance between the screw outside diameter and the nut full diameter is about 0.040 inch (i.e. 1.790 minus 1.750), plus or minus several thousandths of an inch due to relatively flexible tolerances. This provides an excellent lubricant reservoir (Fig. 5) in this outer thread zone. The lubricant tends to remain in the assembly rather than being squeezed out as occurs in conventional units, due to the controlled dimensional relationships. This helical lubricant reservoir has an effective wiping action for the threads.

In these examples, the thread angle is 14°, i.e. the flank angle is 7°, while the helix angle is 5° 40′. The threads have a depth of about three-quarter pitch. When these screws and nuts with this thread system are threadably interengaged, and under compressive load as in a landing gear assembly (Fig. 6), the roots of the screw threads are in complete engagement with the crests of the nut threads at the minor diameters of the screw and nut. There is a significant lubricant reservoir clearance, however, between the crest of the screw threads and the root of the nut threads. Lubricant inserted in this helical reservoir during initial assembly remains in the assembly for a relatively long time, since it cannot be squeezed out between the lower sidewall of the screw thread and the mating upper sidewall of the nut thread because these are held in constant bearing engagement over the length of the nut.

A controlled end clearance of about 0.010 to 0.015 inch is provided, as noted previously with this clearance occurring between the upper sidewall of the screw threads and the adjacent lower sidewall of the nut threads, when the assembly is under compressive load. This clearance assures lack of binding under the bowing forces occurring under compressive load in a load elevation jack environment as in a landing gear assembly.

When the novel screw and nut combination is used in a landing gear assembly, the screw diameter should be of a diameter between about 1½—2 inches, usually 1½ inches, 1¾ inches, or 2 inches, typically 1¾ inches. The combination has distinct advantages whether manually or power operated. If used in other environments, smaller or larger screw and corresponding nut sizes might be desired, e.g. from 1 inch to 3 inches or so. The same basic dimensional and angular relationships set forth above hold, with the proportions being basically the same.

When the novel thread assembly is formed according to the criteria set forth above, it has been found that an excellent operational relationship results, with the torque required to operate a landing gear being substantially reduced, with the unit having a considerably longer useful life, with greater safety being supplied over a long period, without the tendency of the landing gear of rapidly wearing localized thread portions to cause rapidly increasing cranking torque for operation, and with the unit have good lubricating action over a long useful period.

The inventor herein realizes that thousands of different thread systems have been devised over the years to suit particular usages. However, he has discovered and developed a particular unique thread system for compressive loading arrangements, particularly for vehicle landing gear, that has been found by extensive testing to be particularly advantageous in effectuating a simulated bearing/bushing effect in a screw nut combination, when the dimensional and configuration relationships are controlled within certain discovered limits.

The discovered invention is defined by the attached claims.

We claim:

1. A haulage vehicle hoisting landing gear assembly comprising: bracket attachment means for securement to a haulage vehicle, ground engaging means, vertically expandable means interconnecting said bracket attachment means and said ground engagement means, including a screw shaft and interfitting nut apparatus and means to rotationally operate such apparatus; said apparatus including a screw shaft and nut combination comprising a screw shaft having helical threads with a helix angle between about 4° 40' and 7°, and a thread angle of about 0°—20°; an internally threaded nut having helical threads of matching helix angle and thread angle; and one of (a) the major screw thread diameter and the major nut thread diameter, and (b) the minor screw thread diameter and the minor nut thread diameter, having substantially no clearance therebetween to form a simulated bearing/bushing relationship, and the other of (a) and (b) having a substantial clearance therebetween.

2. A haulage vehicle hoisting landing gear assembly comprising: bracket attachment means for securement to a haulage vehicle, ground engaging means, vertically expandable means interconnecting said bracket attachment means and said ground engagement means, including a screw shaft and interfitting nut apparatus and means to rotationally operate such apparatus; said apparatus including a screw shaft and nut combination comprising a screw shaft having helical threads with a helix angle between about 4° 40' and 7°, and a thread angle of about 0°—20°; an internally threaded nut having helical threads of matching helix angle and thread angle; and the core diameter of said screw shaft being substantially equal to the minor diameter of said nut so as to have substantially no clearance therebetween to form a simulated bearing/bushing relationship.

3. The combination in claim 2 wherein said clearance is between 0 and 0.0075 inch.

4. The combination in claim 2 wherein said clearance is between about 0.002 and 0.005 inch.

5. The combination in claim 2 wherein said thread angle is about 12°—20°.

6. The combination in claim 2 wherein a substantial clearance is provided between the major screw shaft diameter and the major nut thread diameter to form a lubricant reservoir.

7. The combination in claim 2 having an axial clearance of about 0.0002—.025 inch.

8. The combination in claim 2 having an axial clearance of about 0.005—0.015 inch.

PO-1050
(5/69)

UNITED STATES PATENT OFFICE
CERTIFICATE OF CORRECTION

Patent No. 3,596,877            Dated August 3, 1971

Inventor(s) Budd Eastman

It is certified that error appears in the above-identified patent and that said Letters Patent are hereby corrected as shown below:

Column 2, line 67

"elevators" should be ---elevates---

Column 2, line 69

After "This" insert ---portion of the cranking operation is extremely tedious and---

Column 4, line 43

After "both" change "3/4" to ---1 3/4---

Column 6, line 41, claim 7

"0.0002" should be ---0.002---

Signed and sealed this 21st day of March 1972.

(SEAL)
Attest:

EDWARD M. FLETCHER, JR.            ROBERT GOTTSCHALK
Attesting Officer            Commissioner of Patents